United States Patent

Pitts et al.

[11] Patent Number: 4,511,616
[45] Date of Patent: Apr. 16, 1985

[54] ANTICOUNTERFEIT MAGNETIC METALLIZED LABELS

[75] Inventors: Warren R. Pitts, Needham; Herbert W. Salit, Ashland, both of Mass.

[73] Assignee: Dennison Mfg. Company, Framingham, Mass.

[21] Appl. No.: 466,257

[22] Filed: Feb. 14, 1983

[51] Int. Cl.[3] .................. B44C 1/10; B32B 31/12; B32B 15/02
[52] U.S. Cl. .................................. 428/203; 428/204; 428/692; 428/446; 428/916; 427/7
[58] Field of Search ............ 428/900, 692, 446, 693, 428/916, 203, 204; 346/227; 427/7

[56] References Cited

U.S. PATENT DOCUMENTS

| | | | |
|---|---|---|---|
| 3,498,837 | 3/1970 | Alstad et al. | 428/900 X |
| 4,166,144 | 8/1979 | Ameikar | 428/40 |
| 4,183,989 | 1/1980 | Tooth | 428/900 X |
| 4,215,170 | 7/1980 | Vilaprinyo Oliva | 428/328 |
| 4,258,920 | 3/1981 | Waldron et al. | 428/900 X |
| 4,315,145 | 2/1982 | Nishikawa et al. | 428/900 X |
| 4,352,706 | 10/1982 | Miller | 156/233 |

Primary Examiner—George F. Lesmes
Assistant Examiner—Nancy A. B. Swisher
Attorney, Agent, or Firm—George E. Kersey; Barry D. Josephs

[57] ABSTRACT

An electrosensitive security laminate including a magnetic layer providing a magnetically encodable substrate. The laminate includes a base layer such as paper, a magnetic layer deposited on the base layer, and a vapor deposited metallic layer either over the magnetic layer or the opposite face of the base layer. Additional security may be achieved by including a decorative intermediate layer having a visibly nonuniform pattern. The user may detect a magnetically encoded pattern using a device which forms a visible pattern in accordance with any magnetic field adjacent the laminate. The patterned intermediate layer where included may be selectively exposed by electrically imprinting the metallized layer, thereby exposing a background pattern within any inscribed indicia.

17 Claims, 8 Drawing Figures

ANTICOUNTERFEIT MAGNETIC METALLIZED LABELS

BACKGROUND OF THE INVENTION

Commonly assigned U.S. application Ser. No. 317,222, filed Nov. 2, 1981, contains related subject matter.

The present invention relates to the manufacture of tags and labels, and more particularly to the production of the tags and labels of types which are difficult to counterfeit. The invention additionally relates to the secure recording of information in such tags and labels.

It is desirable in many commercial applications to employ tags or labels which are unique and which resist illicit duplication. It is well known in many industries that so-called "pirates" will simulate a product using inferior materials and production techniques, and will sell these products at a reduced price.

Typically, the pirate will mimic the packaging and labelling of goods in order to "pass off" his goods as the product of a well established enterprise. It is therefore desirable to provide tags and labels of a design which may not be easily duplicated, or which if duplicated may be easily detected as fraudulent.

The banking industry has fostered many efforts to design commercial paper of a type which will frustrate attempts to alter the paper after inscription with dollar amounts and other information; this is commonly known in the trade as "safety paper". Representative patents disclosing such safety paper include U.S. Pat. Nos. 1,564,724; 2,030,351; 2,232,424; 2,048,780; and 2,804,821. The product designs and manufacturing techniques disclosed in these references are unsuitable in the present context, in that they are not designed to prevent the counterfeiting of documents but rather the alteration of previously inscribed documents. Furthermore, these techniques are incompatible with the properties of metallized tags, labels, and the like.

U.S. Pat. Nos. 3,001,886 and 4,299,637 disclose designs for information-containing substrates which protect the information with an opaque layer to frustrate untimely or undetected revelation of the information. Unlike the laminates of the present invention the prior art substrates are not intended to provide visibly inscribed information and as such are unsuitable for tags and labels.

Accordingly, it is a principal object of the invention to provide tags and labels of a sort which are difficult to duplicate. A related object is the design of tags and labels of this type which incorporate unique product identification information. Another related object of the invention is the use of a tag and label manufacturing technique which is beyond the resources of typical "pirates".

A further object of the invention is the achievement of a pleasing appearance in such tags and labels. It is a related object to provide a versatile range of tag and label formats.

Still another object of the invention is the secure encoding of information in such tags and labels. As a related matter it is desirable to provide dual levels of recording information, one visible and another requiring special detection apparatus.

SUMMARY OF THE INVENTION

In furthering the above and additional objects, the invention provides metallized, magnetic security laminates and methods of producing such laminates, of a type particularly suitable for the production of tags, labels, and the like. The laminates of the invention include a base layer, a magnetic layer deposited on one face of the base layer, and a metallized layer which may be vapor deposited over the magnetic layer, or alternatively over the opposite face of the base layer. This laminate provides dual levels of information recording: magnetic encoding of the magnetic layer, and electrosensitive inscription of the metallic layer.

In accordance with one aspect of the invention, the security laminate may be produced by vacuum metallizing one face of a base layer, and depositing a magnetic layer on an opposite face of the base layer. Alternatively the metallized layer may be vapor deposited over the magnetic layer. The magnetic layer may be magnetized in a prescribed pattern during the course of forming the laminate, or subsequently to completing the laminate.

Applicants have observed that the presence of the vapor deposited metallic layer enhances the magnetic properties of the laminate, facilitating detection of an encoded magnetic pattern. The user may detect a magnetically encoded pattern using any known device which forms a visible pattern in accordance with any magnetic field pattern in the region of the device.

In an alternative embodiment of the invention, the magnetic layer comprises a patterned layer, including magnetizable portions and nonmagnetizable portions. By applying a saturating magnetic field to this layer, the user encodes the layer according to the imprinted pattern.

In the preferred embodiment of the invention, the laminate further includes an intermediate layer below the vapor deposited metallic layer, said intermediate layer having a visibly nonuniform appearance, in accordance with commonly assigned U.S. application Ser. No. 317,222. During the electrosensitive imprinting of the metallic surface layer, the intermediate layer is selectively exposed within the borders of the inscribed indicia. Advantageously, this intermediate layer includes a decorative pattern, typically a multicolored pattern.

In a particular version of this preferred embodiment, the intermediate layer is imprinted using a plurality of inks having different glosses, resulting in a replication of its pattern in the vapor-deposited surface layer. Alternatively, the laminate may be produced with a metallic layer of uniform appearance, such as by inclusion of an additional lacquer layer between the visibly nonuniform layer and the metallized layer.

In electrosensitively imprinting the laminate of the preferred embodiment, the patterned intermediate layer may be exposed in a random manner, or alternatively may be exposed to provide a predetermined pattern within the inscribed indicia. The laminates are particularly difficult to duplicate in the first instance due to the haphazard nature of the exposed pattern.

The user may easily distinguish tags or labels produced in accordance with the preferred embodiment from inexpensive imitations. One method of detecting imitations involves applying an electrically actuated stylus to a noninscribed area of the surface, which should result in additional exposure of the intermediate layer. The magnetic sublayer provides additional security in that the user may magnetically inscribe this layer with security codes and the like.

In the preferred construction of these substrates the base layer comprises paper or any other known label stock; the magnetic layer comprises a coating of a ferromagnetic pigment in a film-forming resin binder; and the metallic layer comprises vapor-deposited aluminum of a thickness suitable for electrosensitive imprinting. The intermediate layer where included consists of a plurality of pigmented resin formulations forming a prescribed pattern. Where a "ghost imaging" effect is desired the components are chosen to provide various glosses in the intermediate patterned layer.

BRIEF DESCRIPTION OF THE DRAWINGS

The above and further aspects of the invention are illustrated in the detailed description of the preferred embodiment which follows, taken in conjunction with the drawings in which.

DETAILED DESCRIPTION

Figure 1:
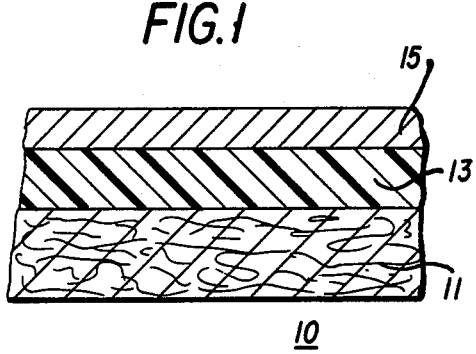
FIG. 1 is a sectional view of a magnetic metallized substrate in accordance with a first embodiment of the invention.
Figure 2:
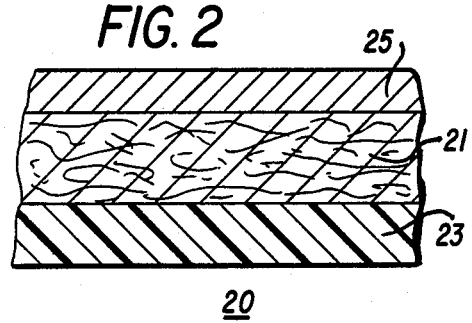
FIG. 2 is a sectional view of a magnetic metallized substrate in accordance with a second embodiment of the invention.

FIGS. 1 and 2 provide sectional views of metallized magnetic laminates including the basic elements of the invention. The components of security laminate 10, as seen in FIG. 1, are a base layer 11, a magnetizable layer 13, and a vapor-metallized surface layer 15. The magnetizable layer 13 is interposed between the base layer 11 and metallized layer 15. Alternatively, as seen in substrate 20 in FIG. 2, a magnetic layer 23 may be deposited on one face of base layer 21, with metallized layer 25 on the opposite face. The former embodiment, and the embodiments to be discussed below, have the advantage in the case of a paper base layer of separating this layer from the metallized layer with an intervening, typically resin, layer. Such an interposed resin layer prevents penetration of the paper base with the vaporized metal, and protects the paper base during electrosensitive printing.

Laminate 10 and the other disclosed laminates are particularly suitable for the fabrication of tags, labels and other substrates providing secure recording of information. Either during the fabrication of substrate 10 or subsequently thereto, magnetic layer 13 may receive a desired magnetic pattern, such as any well known magnetic bit patterns. This pattern will not be visible upon normal inspection, but may be detected using suitable apparatus as disclosed below. This magnetic layer may be encoded, for example, to verify retail inventory at point of sale.

Applicants have observed that the presence of a metallized surface layer 15 in substrate 10 enhances the magnetic properties even in the case of a diamagnetic material such as vapor deposited aluminum. In the formation of tags, labels, and the like, additional layers (not shown) such as a pressure sensitive adhesive, release paper backings, etc. may be included.

Figure 3:
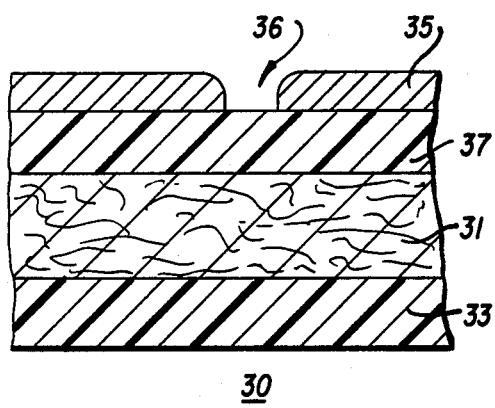
FIG. 3 is a sectional view of a preferred variant of the laminate of FIG. 2, including electrical imprint.

FIG. 3 shows in section a laminate 30 similar in design to the laminate 20 of FIG. 2. In addition to base layer 31, magnetic layer 33, and metallized layer 35, substrate 30 includes a patterned intermediate layer 37 in accordance with commonly assigned Ser. No. 317,222. The metallized surface layer 35 is selectively removed at 36 to reveal the patterned intermediate layer 37.

Figure 5:
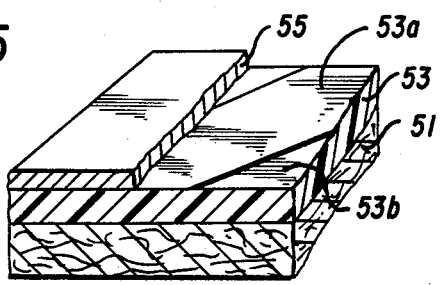
FIG. 5 is a cutaway schematic view of a magnetic metallized substrate of the type shown in FIG. 1, with a patterned magnetic layer.

FIG. 5 shows a schematized cutaway view of a magnetic substrate 50 corresponding to the three layer construction 10 of FIG. 1. In substrate 50, the magnetic layer 53 includes magnetizable portions 53a, and nonmagnetic portions 53b. By imposing a saturating magnetic field, the layer 53 will be magnetized in accordance with a predetermined magnetic pattern.

Figure 6:
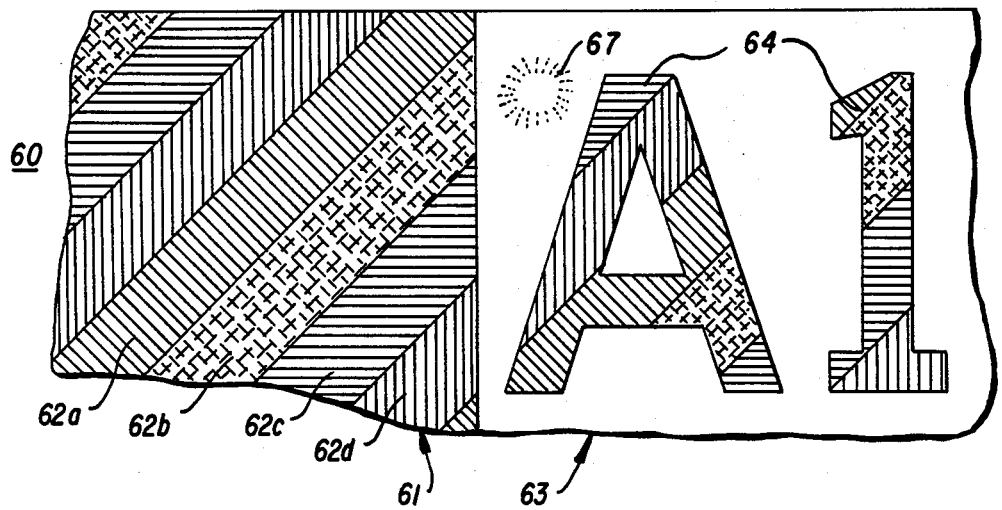
FIG. 6 is a partial plan view of an illustrative magnetic metallized laminate in accordance with the preferred embodiment, with the metallized surface partially removed.

FIG. 6 gives a plan view of a substrate 60 similar to that shown in-section in FIG. 3. The patterned layer 61 (exposed on the left side) is imprinted in a complex pattern, in contrast to the uniformly colored layers typically found in prior art electrosensitive substrates. In the illustrated substrate, the colored layer 61 comprises a series of diagonal colored stripes 62a–62d in a repeating pattern of green - orange - blue - red. The pattern of layer 61 may include variations in hue (as shown), chromatic intensity, gloss, etc. After metallization, this complex pattern is partially exposed at 64 by electrically vaporizing the metallized surface 63. Characteristically, the metallized layer 63 is selectively removed in an informational pattern, with the exposed layer 61 providing a decorative background pattern. In addition to the visibly inscribed pattern of indicia 64, substrate 60 also contains a magnetic pattern (partially shown in phantom at 67) formed by magnetizing the magnetic sublayer (not shown).

In one version of this embodiment, the electrically inscribed indicia expose random portions of the underlying patterned layer. For example, in the embodiment of FIG. 6, the indicia might encompass any possible sequence of colored diagonal stripes 62a, b, etc. This technique is advantageously employed in the manufacture of tags, labels, or the like. In such an application, the indicia 64 might comprise unique identifying information, such as serial numeration of tickets. Tags and labels of such manufacture would not be easily reproducible, in that conventional serial printing apparatus provides monochromatic alphanumeric characters. This would be particularly true where the patterned underlayer is randomly exposed during electrosensitive printing, thereby providing a variety of patterns superimposed over the inscribed information.

Figure 4:
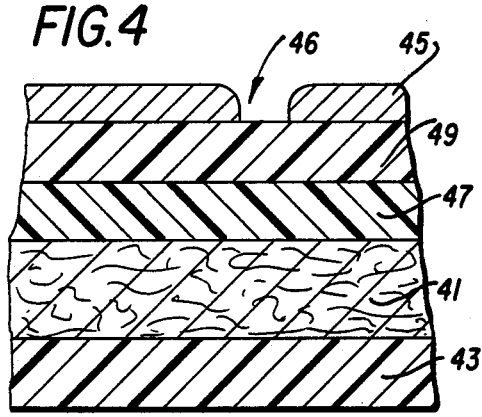
FIG. 4 is a sectional view of an alternative embodiment of the laminate of FIG. 3.
Figure 7:
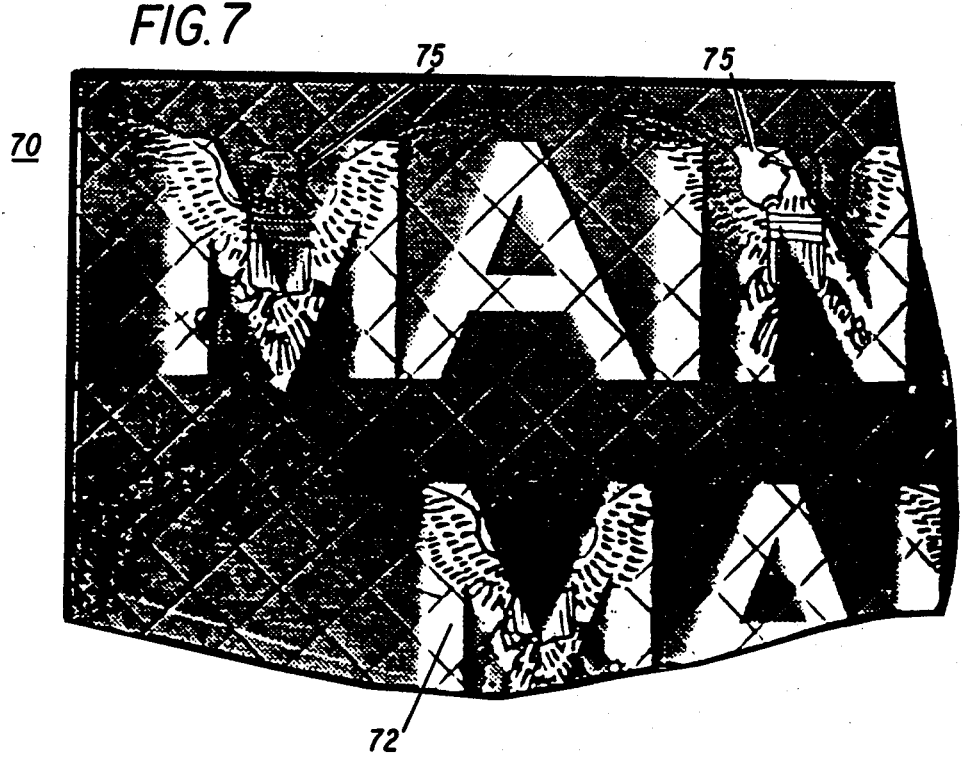
FIG. 7 is a partial plan view of a magnetic metallized laminate of the type shown in FIG. 3.

In an alternative version of this embodiment shown in FIG. 7, the patterned intermediate layer is imprinted using a variety of printing inks providing different surface textures, i.e. gloss. After metallization, this will result in ghosts 75 of the printed image in that the metallized surface will appear lighter in areas of greater gloss of the patterned layer. This may be used to create an embossed effect in the metallized surface, as shown in FIG. 7. If such an effect is not desired, an alternative substrate 40 may include an additional lacquer layer 49 as a buffer between colored layer 47 and metallized layer 45 (FIG. 4). Lacquer layer 49 ensures a uniform appearance of the metallized layer despite any nonuniformities in layer 47. An additional patterned layer (not shown) may be inserted between lacquer layer 49 and metallized layer 45 to superimpose an additional pattern (such as logotypes as discussed below) over the pattern of layer 47.

As illustrated in the plan view of FIG. 7, the patterned layer is printed in repeating pattern of logotypes, which may be employed in tags, labels, etc. to identify the source. This pattern may be registered with the inscribed message 72 during the electrosensitive printing process. In the embodiment in which the pattern of the colored layer is reflected in ghost images in the metallized surface, such logotypes provide a watermark effect.

In the preferred embodiment (referring for illustration to FIG. 3) the base layer 31 comprises paper, which acts as a support for the magnetic layer 33 and colored intermediate layer 37. Any suitable paper known in the metallizing art may be employed for its compatibility with the materials and coating technique of the laminate 30. In broadest terms the base layer 31 may be any suitable material to provide a support for the other layers of metallized substrate 30. For example, base layer 31 may comprise a nonwoven fabric.

A preferred composition for magnetic layer 33 is a film-forming resin encapsulating a ferromagnetic pigment. Layer 33 may be formed on a paper base layer 31 using any coating technique well known in the production of metallized papers. Layer 33 may include plasticizers, surfactants, and other suitable additives known in the art.

Metallized layer 35 advantageously consists of a vapor-deposited aluminum layer. Such a layer may be effectively and economically formed by conventional high vacuum metallizing apparatus. For an electrosensitive imprintable surface a surface resistivity in the range from about 1 to 8 ohms per square is preferred, most preferably between about 1.5 and 3.5 ohms per square. A thickness of about 25 to 30 millimicrons has proven suitable for this purpose.

Colored layer 37 illustratively includes a plurality of formulations, each consisting of a film-forming resin binder and a pigment. Suitable pigments and binder materials are well known in the art of electrosensitive papers. Where it is desired to achieve a variety of surface textures layer 37 may incorporate pigments of different granularities. In general, pigments which are well ground and well dispersed in the binder will provide a greater surface gloss. It is furthermore advisable in the areas of greater gloss to employ a vehicle which will not unduly penetrate the base layer 31. Layer 37 may also incorporate matting agents, plasticizers, or other additives well known in the art.

Figure 8:
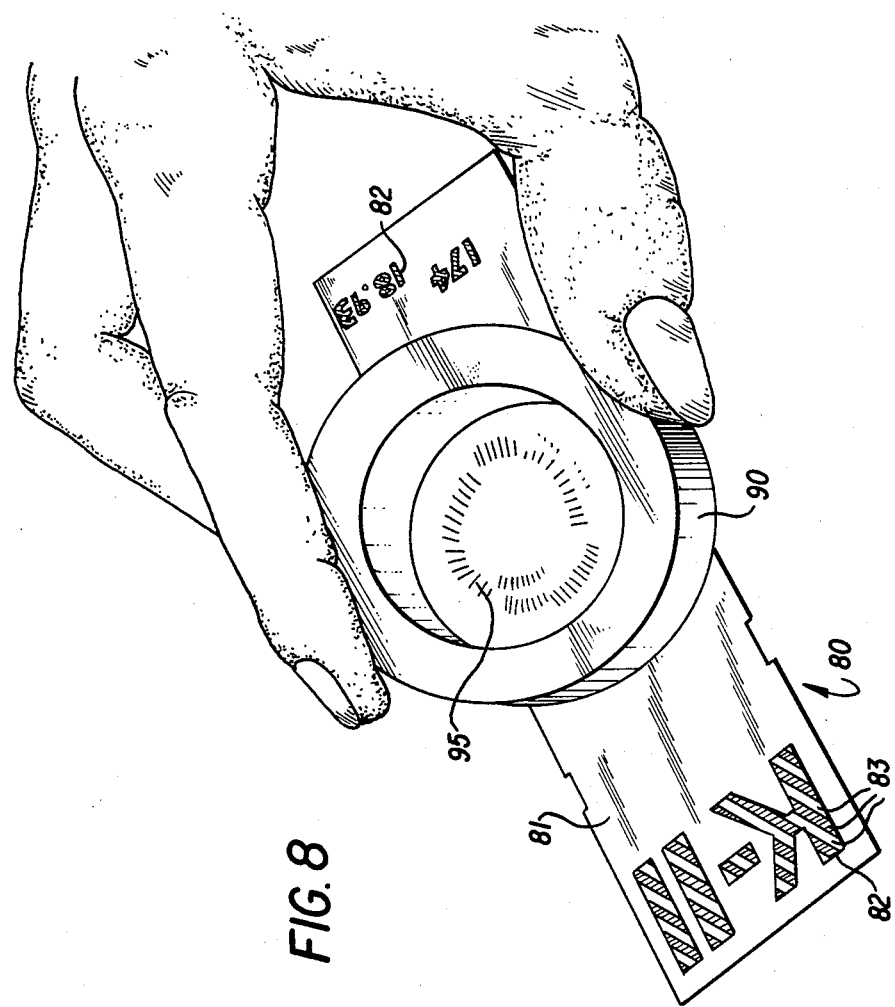
FIG. 8 is a perspective view of the detection of a magnetic pattern in an illustrative magnetic metallized tag.

FIG. 8 illustrates a user's detection of a magnetic pattern contained in a metallized magnetic ticket 80 in accordance with the invention. The metallized surface 81 of ticket 80 is selectively removed in a plurality of indicia 82 to reveal a series of colored stripes 83 contained in a patterned sublayer. In addition to this visible pattern, ticket 80 contains a normally invisible pattern which may be detected, for example, using the illustrated magnetic pattern viewer 90. Any suitable viewer may be employed, such as that disclosed in U.S. Pat. No. 3,013,206 and shown in FIG. 8. Viewer 90 houses a liquid dispersion of ferromagnetic particles, which align at 95 with the magnetic field emanating from the magnetized sublayer (not shown).

Applicants have observed upon erasure of a magnetic pattern (such as pattern 95 of FIG. 8) a residual pattern. This presents a hindrance to remagnetization by the would-be counterfeiter. The patterned magnetic layer laminate 50 (FIG. 5) has the advantage that the pattern is not removed by treatment with a permanent magnet, but requires complex electromagnetic apparatus for this purpose.

The invention is further illustrated in the following non-limiting examples, in which all parts are by weight.

EXAMPLE 1

A 40 pound (24"×36" basis weight) size coated paper was coated with a magnetic coating formulation, consisting of gamma ferric oxide [$\gamma$-$Fe_2O_3$] and cellulose acetate butyrate binder in a 3:1 solvent to solids solution in ethyl acetate and toluol. The pigment loading was 70 percent, and the dried coating thickness was 0.4 mil. This layer was coated from solution using conventional gravure coating apparatus and dried in a convection oven. The magnetic layer was then magnetized in a circular bit pattern. Finally, the substrate was vacuum metallized over the magnetic layer with a thin aluminum film having a surface resistivity of 2.5 ohms per square.

The magnetic pattern was easily detectable using the magnetic pattern viewer of U.S. Pat. No. 3,013,206.

EXAMPLE 2

A magnetic security laminate was fabricated as set forth in EXAMPLE 1, with the modification that the laminate was magnetized subsequently to the metallizing step. Comparable magnetic properties were observed.

EXAMPLE 3

A magnetic security laminate was produced as in EXAMPLE 1, with the following modifications. The metallized layer was directly deposited over the base paper, and the magnetic layer was thereafter coated onto the opposite face of the paper. Finally, the laminate was magnetized as in EXAMPLE 1. Comparable performance was provided using the '206 detection device.

EXAMPLE 4

A magnetic security laminate was produced as in EXAMPLE 1, with the following modifications. The magnetic layer was printed in a pattern of 2 mm wide diagonal stripes, wherein every other stripe contained the magnetic oxide formulation of EXAMPLE 1. Intervening stripes omitted the magnetic oxide component of this formulation. This layer was magnetized in the oxide-containing areas by passing the substrate through a saturating magnetic field.

The striped magnetic pattern was easily detectable using the '206 detection device, and was unaffected by subsequent exposure to a permanent magnet.

EXAMPLE 5

A magnetic security laminate was fabricated as in EXAMPLE 3, with the following modifications. Prior to metallization, the paper face to be metallized was printed with a pattern of adjacent colored diagonal stripes. The pattern consisted of a series of 2 mm wide stripes in the repeating sequence violet, red, green, orange, blue, and yellow. The stripes were imprinted using a rotary flexographic press with conventional flexo inks.

After depositing the magnetic layer and magnetizing, the laminate was slit into 3 inch wide rolls, and serially inscribed with 6 mm numerals using an Axiom Corp. (Glendale, CA) EX-850 electrosensitive printer.

The laminate showed comparable magnetic properties using the '206 detection device.

EXAMPLE 6

A security laminate was produced in accordance with EXAMPLE 5, with the additional step prior to metallization of coating the substrate with a clear flat acrylic lacquer at a coating weight of 2 pounds/ream. Whereas the substrate of EXAMPLE 5 evidenced a striped pattern in the metallized surface, the substrate of EXAMPLE 6 achieved a uniform surface appearance.

While various aspects of the invention have been set forth by the drawings and the specification, it is to be understood that the foregoing detailed description is for illustration only and that various changes in parts as well as the substitution of equivalent constituents for those shown and described, may be made without departing from the spirit and scope of the invention as set forth in the appended claims.

We claim:

1. A metallized security laminate for electrosensitive printing, comprising, in sequence:
    a base layer;
    a magnetic pattern layer coated onto said base layer;
    a decorative background layer coated onto said magnetic pattern layer, said decorative background layer forming a visibly heterogeneous pattern; and
    a vapor-deposited metallic surface layer, having a surface resistivity in the range from 1 to 8 ohms per square,
    wherein the magnetic pattern layer provides a distinct magnetic pattern along the surface of the metallic layer.

2. A metallized security laminate as defined in claim 1, wherein the vapor-deposited metallic layer is selectively removed in a plurality of informational indicia to express visibly heterogeneous portions of the decorative background layer.

3. A metallized security laminate as defined in claim 1 wherein the vapor-deposited metallic layer has a visibly nonuniform pattern in accordance with the pattern of said decorative background layer.

4. A metallized security laminate as defined in claim 1, wherein the base layer comprises paper, the magnetic pattern layer comprises a film-forming resin admixed with a ferromagnetic pigment, and the decorative background layer comprises a pigmented resin layer.

5. A metallized security laminate as defined in claim 1 further comprising a buffer layer interposed between the decorative background layer and the vapor-deposited metallic layer, wherein the vapor-deposited metallic layer has a uniform appearance.

6. A metallized security laminate as defined in claim 1 wherein the magnetic pattern layer is comprised of magnetizable portions and nonmagnetizable portions.

7. A metallized security laminate for electrosensitive printing in a pattern of indicia, comprising, in sequence:
    a base layer;
    a magnetic pattern layer over said base layer;
    a decorative background layer deposited over said magnetic pattern layer, said decorative background layer forming a decorative pattern characterized by visible variations within areas of the magnitude of said indicia; and
    a vapor-deposited metallic surface layer, having a surface resistivity of between 1 and 8 ohms per square,
    wherein said magnetic pattern layer provides a distinct magnetic pattern along the surface of the metallic layer.

8. A metallized security laminate as defined in claim 7, wherein areas of the metallic surface layer are electrically removed in a plurality of informational indicia to expose the decorative background layer within the boundaries of said indicia.

9. A metallized security laminate as defined in claim 7, wherein the vapor-deposited metallic layer has a visibly nonuniform pattern in accordance with the pattern of said decorative background layer.

10. A metallized security laminate as defined in claim 7 further comprising a buffer layer interposed between the decorative background layer and the vapor-deposited metallic layer, wherein the vapor-deposited metallic layer has a uniform appearance.

11. A metallized security laminate as defined in claim 7 wherein the magnetic pattern layer is comprised of magnetizable portions and nonmagnetizable portions.

12. A metallized security laminate for electrosensitive printing, comprising, in sequence:
    a base layer;
    a magnetic pattern layer coated onto said base layer;
    a decorative background layer coated onto said magnetic pattern layer, said decorative background layer forming a visibly variable pattern; and
    a vapor-deposited metallic surface layer, having a surface resistivity in the range from 1 to 8 ohms per square,
    wherein the magnetic pattern layer provides a distinct magnetic pattern along the surface of the metallized layer, and wherein the visibly nonuniform pattern of said decorative background layer is simulated by ghost images in the vapor-deposited metallic layer.

13. A metallized security laminate as defined in claim 12, wherein the vapor-deposited metallic layer is selectively removed in portions thereof to expose the decorative background layer in a plurality of informational indicia.

14. A metallized security laminate as defined in claim 13, wherein given indicia expose visibly heterogeneous areas of the decorative background layer.

15. A metallized security laminate as defined in claim 12 wherein the vapor-deposited metallic layer has a visibly nonuniform pattern in accordance with the pattern of said decorative background layer.

16. A metallized security laminate as defined in claim 12 wherein the magnetic pattern layer comprises a mixture of film-forming resin and a ferromagnetic pigment, the base layer comprises paper, the decorative background layer comprises a mixture of a film-forming resin and a plurality of colored pigments, and wherein the metallic surface layer comprises vapor-deposited aluminum.

17. A metallized security laminate as defined in claim 12 wherein the magnetic layer is comprised of magnetizable portions and nonmagnetizable portions.

* * * * *